United States Patent [19]

Kimura et al.

[11] Patent Number: 4,954,761
[45] Date of Patent: Sep. 4, 1990

[54] CONTROL SYSTEM OF AN INDUSTRIAL ROBOT

[75] Inventors: Yutaka Kimura; Hiroshi Okumura; Hirokata Mihara; Mitsutoshi Yoshida, all of Nagoya, Japan

[73] Assignee: Mitsubishi Jukogyo K. K., Tokyo, Japan

[21] Appl. No.: 234,266

[22] Filed: Aug. 19, 1988

[30] Foreign Application Priority Data

Oct. 23, 1987 [JP] Japan .................................. 62-266526
Nov. 16, 1987 [JP] Japan ............................ 62-174802[U]

[51] Int. Cl.$^5$ ............................................. G05B 19/18
[52] U.S. Cl. .................................. 318/568.1; 364/513; 318/568.13
[58] Field of Search ................ 318/568, 567, 560, 562, 318/567–570, 575; 901/1–5, 20; 364/191–193, 513, 148–151, 167.01, 188, 573

[56] References Cited

U.S. PATENT DOCUMENTS 4,546,443 10/1965 Oguchi et al. ........................ 364/513
4,595,989 6/1986 Yasukawa et al. ................... 364/513

FOREIGN PATENT DOCUMENTS 47-35489 11/1972 Japan .
51-104764 9/1976 Japan .
60-225208 11/1985 Japan .
62-84305 4/1987 Japan .
62-163110 7/1987 Japan .

Primary Examiner—William M. Shoop, Jr.
Assistant Examiner—David Martin
Attorney, Agent, or Firm—Stanger, Michaelson, Spivak & Wallace

[57] ABSTRACT

A control system of an industrial robot includes an operation program read out from a storage medium and stored and calculated to obtain data so that a robot machine is controlled on the basis of the data. An external memory has function of a conventional internal memory and it is limited to store one program in, for example, an IC card constituting the storage medium and the IC card is inserted into the external memory to supply the operation program. A plurality of operation programs are previously stored in, for example, a floppy disk device constituting a recording medium of the external memory and a desired program is selected by a keyboard to directly supply it to the controller of the robot to operate the robot.

2 Claims, 8 Drawing Sheets

CONTROL SYSTEM OF AN INDUSTRIAL ROBOT

FIELD OF THE INVENTION AND RELATED ART STATEMENT

The present invention relates to a control system of an industrial robot, and more particularly to an improvement of a memory storing an operation program of the robot and applicable to the whole of control systems for industrial apparatus such as a numerical control device or the like requiring modification of a program.

FIG. 6 is a block diagram showing a conventional control system of an industrial robot and FIG. 7 schematically illustrates a control panel of the conventional control system. As shown in FIG. 6, a robot machine 1 includes a drive motor 11, a speed detector 12 and a position transducer 13 mounted to an operation shaft of the robot machine 1. A controller 2 of the robot comprises a driver 21 which controls the drive motor 11, an internal memory (such as an IC memory or a bubble memory) 23 which forms a main memory within the controller 2 and which stores programs, a memory control circuit 24 which controls the internal memory 23, a command circuit 25 which commands the driver 21 to drive the motor, an arithmetic circuit 26 which directly makes calculation necessary for operation, a control panel 27 necessary for various operation, an external memory formed by a recording medium such as a cassette magnetic tape, a floppy disk device and the like and a loader) 28 used for storage and replacement of programs as an auxilary memory, an RAM 29 and an interface 22 which connects them to each other.

As shown in FIG. 7, the control panel 27 comprises control switches (containing a power switch, operation mode selection switches, a start switch and the like) 31 which serve to operate the robot machine 1, function switches (containing an indication item selection switch, a speed command switch and the like) 32 which command various functions, a program information indicator (constituting by a CRT, a liquid crystal device, a seven-segment element and the like) 33, the external memory 28, control switches 34 for the external memory (containing a write switch and a read switch) and ten keys 35 which serve to key in various information.

In the conventional control system configured above, a plurality of operation programs of the robot are stored in the internal memory 23 and a program necessary for the operation is read out from the internal memory 23 by the keying-in operation to be stored in the RAM 29. The content stored in the RAM 29 is supplied to the driver 21 through the memory control circuit 24 and the arithmetic circuit 26 to effect read out and operation.

As described above, in the conventional control system, the internal memory 23 stores the program. Accordingly, in order to prevent disappearance of the content of the memory 23, it is necessary to adopt a battery-backed-up IC memory or a nonvolatile memory element (such as a bubble memory) as the memory 23. Further, a large memory capacity is required therefor since a plurality of programs are stored.

In addition since the single internal memory 23 has a limited memory capacity and the number of the stored programs can not be increased without limitation, the external memory 28 is provided in parallel therewith as an auxiliary memory for replacement and storage of the program.

However, the conventional control system has problems as follows:
(a) Increased capacity of the internal memory 23.
(b) Complicated hardware and software necessary for reading out the program used for the reading out and operation.
(c) The backup memory is required for storage and the external memory 28 constituting an auxiliary memory is further required in addition to the internal memory 23 constituting a main memory, thereby a cost of the system is increased.
(d) Complicated operation for selectively reading out the program stored in the internal memory 23 in the reading out and operation and complicated operation for transferring the program and data between the internal memory 23 and the external memory 28 are required.

FIG. 8 is a block diagram of another conventional control system of an industrial robot.

When there is much operation and the memory contained in a controller 102 can not store programs for the operation, a personal computer 103 shown in FIG. 8 is employed to store a large number of programs in an FDD 104 contained therein. A necessary program is selectively read out from the FDD and is stored in a CMT 106 constituting a memory medium through a CMT loader 105. The stored program in the CMT 106 is transferred into the memory contained in the controller 102 through a CMT loader 108 connected to the controller 102 so that playback operation of the robot 101 is performed as described above, and the system can thus cope with many kinds of operations.

Further, in another method not shown, data transmission devices are provided in both the personal computer 103 as shown in FIG. 8 and the controller 102 so that the program stored in the FDD 104 of the personal computer 103 is directed transmitted to the memory in the controller 102. The CMT loader 108 provided in the controller 102 is supplied with power from a power supply in the robot 101 and the CMT loader 105 provided in the personal computer 103 is supplied with power from a power source provided independently, while functions of both the CMT loaders may be considered to be identical.

In the above method in which the program is transmitted from the external memory of the personal computer to the controller of the robot by means of the CMT, the capacity of the program which can be written in the CMT is small and the writing and reading operation of the program require considerable time so that its efficiency suffers. The direct transmission method of the program requires as expensive data transmission device and modification for connecting between the controller of the robot and the data transmission device and is generally not used.

OBJECT OF SUMMARY OF THE INVENTION

The present invention has been made in view of the above problems and an object of the present invention is to solve the above problems and to provide a control system of an industrial robot having simple configuration and operation.

In order to achieve the above object, the control system of the industrial robot according to the present invention in which an operation program of the robot is read out from a storage medium and is stored and calculated to obtain data so that a robot machine is controlled on the basis of the data is characterized by the following (1) and (2):

(1) There are provided an external memory for storage and read out of the operation program and a controller having the function of storing and calculating the operation program supplied from the external memory to control the robot machine.

More particularly, the external memory performs as a conventional internal memory and the program stored in, for example, an IC card constituting the storage medium is limited to one program so that the IC card can be inserted into the external memory to read and write the operation program from and into the external memory.

In operation, since the operation program can be replaced only by inserting, for example, the IC card constituting the storage medium into the external memory, an expensive and large-capacity internal memory is not required and only the simple insertion of the IC card is required. Accordingly, operation error due to complicated operation can be prevented.

(2) There are provided an external memory such as, for example, a personal computer having a function of selectively rading out a necessary program from the plurality of operation programs stored previously and including a data transmission device for transmitting the program, a controller including an IC card loader and storing and calculating the operation program supplied through the IC card loader to control the robot machine, and a data transmission cable having an connection terminal mounted at one end thereof and which can be inserted into the IC card loader to connect between the data transmission device and the IC card loader, whereby the operation program is supplied from the external memory through the data transmission cable to the controller.

As described above, since the control system of the present invention constitutes a control system with the data transmission function, the operation programs corresponding to various production can be previously stored in the external memory such as, for example, an FDD (floppy disk device) of the personal computer. Thus, a desired program can be selected by a key board and directly supplied to the controller of the robot to effect reading out and operation. Accordingly, the operation of the robot is not interrupted by a work selection signal supplied outside and can be continued while the robot is operated by the program.

As described above, according to the present invention, the internal memory constituting the main memory and the external memory constituting the auxiliary memory are unified to share a single memory so that the arrangement of the system is simplified. One program is stored in a single IC card, for example, constituting a storage medium so that complicated program control concerning the hardware and software in the controller can be excluded and increase of a cost of the control system can be prevented since a large capacity memory is not required. Further, a burden on an operator due to complicated operation can be reduced to prevent a operation error. Consequently, a control system of the industrial robot having low cost and simple operation can be realized.

DETAILED DESCRIPTION OF PREFERRED EMBODIMENTS

Embodiments of the present invention are now described in detail with reference to drawings.

First Embodiment

Figure 1:
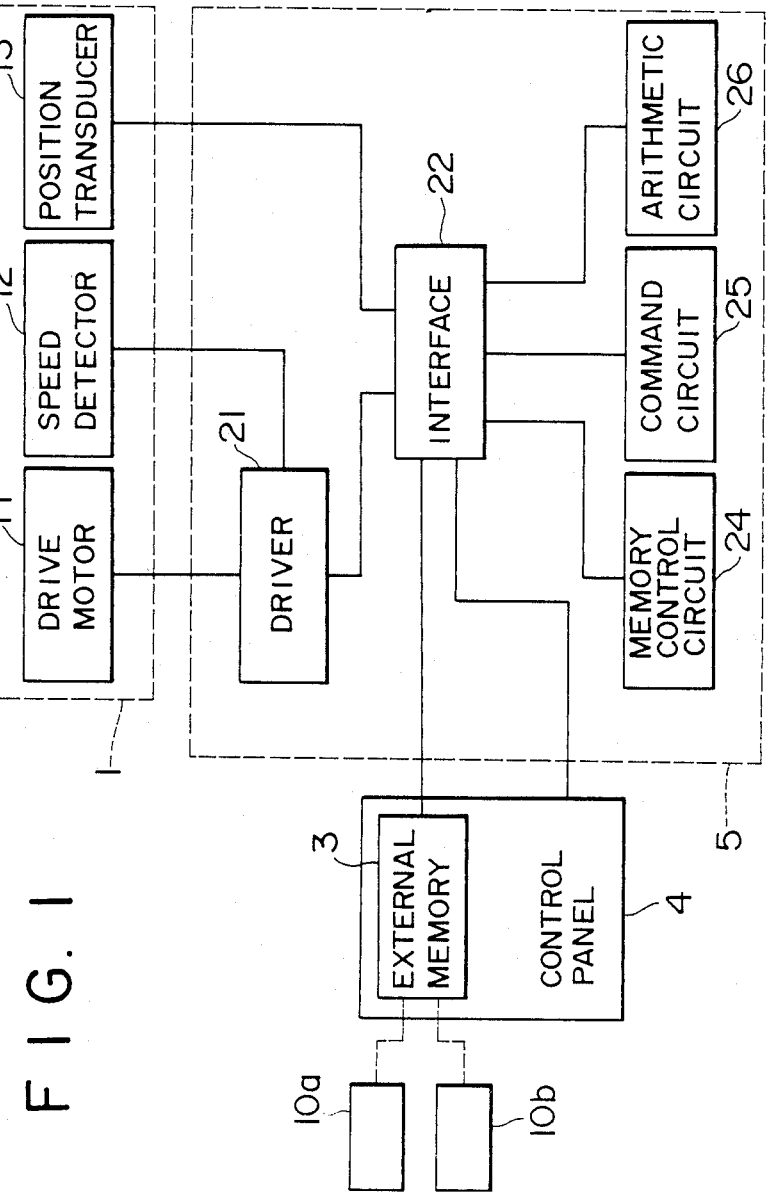
FIG. 1 is a block diagram showing a control system according to a first embodiment of the present invention.
Figure 2:
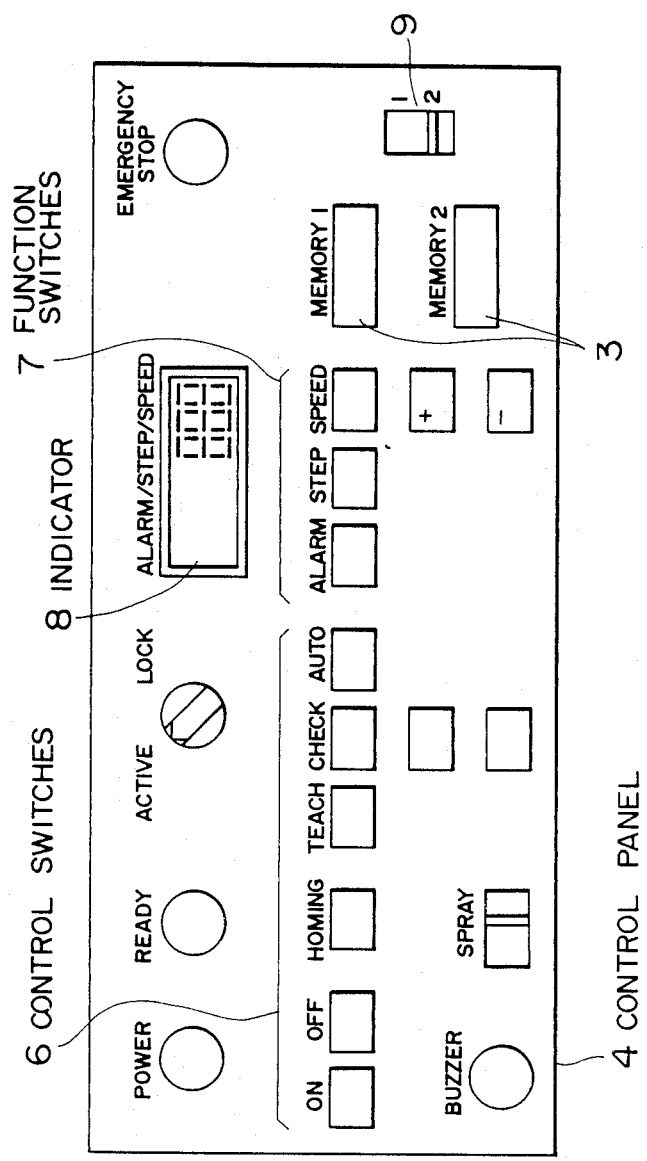
FIG. 2 schematically illustrates a control panel used in the embodiment of FIG. 1.

Referring to FIG. 1 showing a block diagram of a first embodiment of the present invention and FIG. 2 illustrating a control panel used in the first embodiment, a robot machine 1 includes a drive motor 11, a speed detector 12 and a position detector 13 secured to operation shafts not shown, in the robot machine. Information concerning a current position and an operation speed (rotational speed of the drive motor) detected in response to movement of the shafts is supplied to a controller 5 of a robot for the purpose of feedback.

The controller 5 of the robot comprises a driver 21 which controls the drive motor 11, an external memory 3, a memory control circuit 24 which controls the external memory 3, a command circuit 25 which commands movement of the driver 21, an arithmetic circuit 26 which performs arithmetic operation necessary for direct operation, a control panel 4 necessary for various operation and an interface 22 connecting them to each other.

As shown in FIG. 2, the control panel 4 comprises control switches 6 which control operation of the robot machine 1, function switches 7 which command various functions, an indicator 8 for indicating program information or the like when the function switches 7 are depressed, external memories (IC card loaders) 3 and a change-over switch 9. The control switches 9 include an ON switch and an OFF switch for shaft drive motors, A HOMING switch for returning to a starting point, a TEACH switch, a CHECK switch, and an AUTO switch for automatic operation. The function switches 7 include an ALARM switch for alarm information, a STEP switch for step information, a SPEED switch used to indicate a moving speed representative of an index ratio of a teaching speed and the moving speed and INCREASE and DECREASE switches for increasing and decreasing the ratio.

Storage media 10a and 10b use readable and writable IC cards having an IC memory. One IC card can store only one operation program of the robot and can be inserted into and removed from the external memory 3. The CHECK and AUTO switches are used for automatic operation. The CHECK switch is used for the automatic operation with an attendant operator and change-over of the external memories 3 is made by the change-over switch 9. The AUTO switch is used for the automatic operation without an attendant operator and the IC card is adapted to be selected by a detection signal (selection signal from the outside) produced from a sensor not shown and indicative of a type of an object to be processed.

Operation of the embodiment is now described.

(a) The IC card 10a constituting the storage medium in which the operation program of the robot is written is inserted in the external memory (IC card loader) 3. Thereafter, the ON and HOMING switches are depressed to perform initialization. The CHECK or AUTO switch of the control switches 6 is depressed to select a mode and the start switch is then depressed to command automatic playback operation, so that the robot starts the automatic playback operation. During the operation of the robot, the control switches 7 can be operated to indicate the step information (the number of the step or operation at that time) of the operation program and the playback speed information (index number indicative of the moving speed) by the indicator 8. Further, an error and alarm information during operation are indicated by the indicator 8 immediately.

In the case of the CHECK mode, when two IC cards 10a and 10b are inserted into the external memory 3 and are alternately switched by the change-over switch 9 of the control panel or the selection signal from the outside, two programs stored in the two IC cards can be made to operate alternately. Further, if one of the IC cards is exchanged while the program stored in the other card runs, the program can be replaced without replacement time of the program. Further, if the external memory 3 is provided with only one IC card loader, the IC card 10a is removed from the external memory 3 after operation and other IC card 10b is inserted. Thus, the other operation program runs to effect the playback operation in the same manner as above.

(b) In the teaching operation of the robot, a new IC card or an IC card in which a disused program is stored is inserted into the external memory (IC card loader) 3. Then, a teaching mode is selected by the TEACH switch of the control switches 6 and the teaching operation is performed so that the teaching program is directly written into the IC card. The IC card is provided with a write protect switch. If the write protect switch is on, a trouble such as disappearance of the program due to an operation error can be prevented.

The external memory is not limited to the device to which two IC cards can be mounted and may be a device to which a single IC card or three or more IC cards can be mounted.

Second Embodiment

Figure 3:
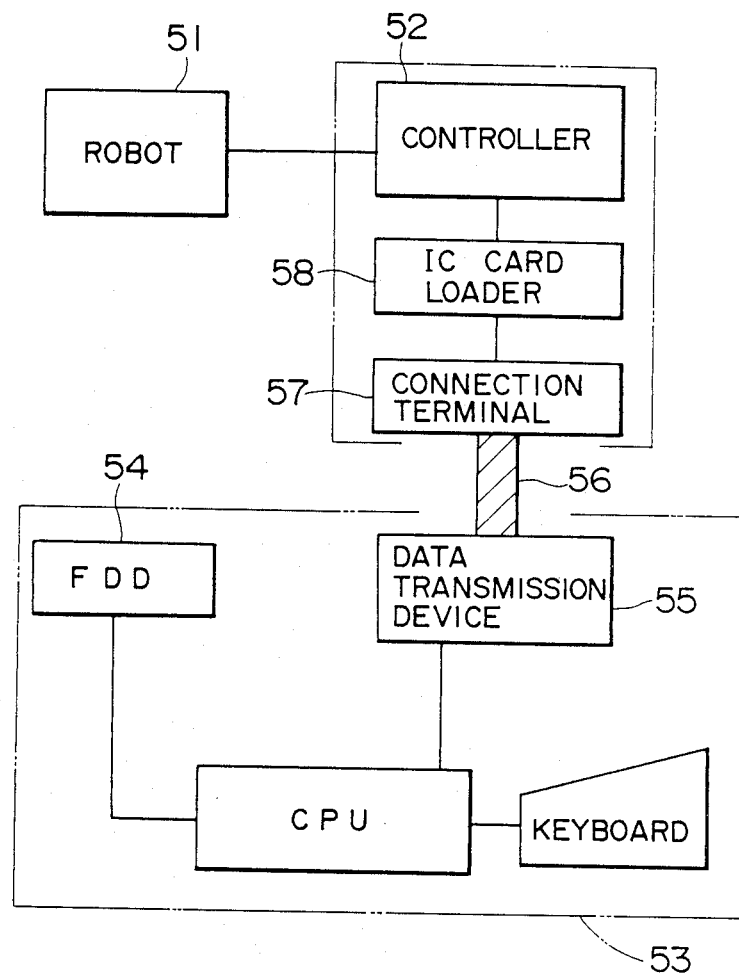
FIG. 3 is a block diagram showing a configuration of a control system of a robot with data transmission function according to a second embodiment of the present invention.
Figure 4:
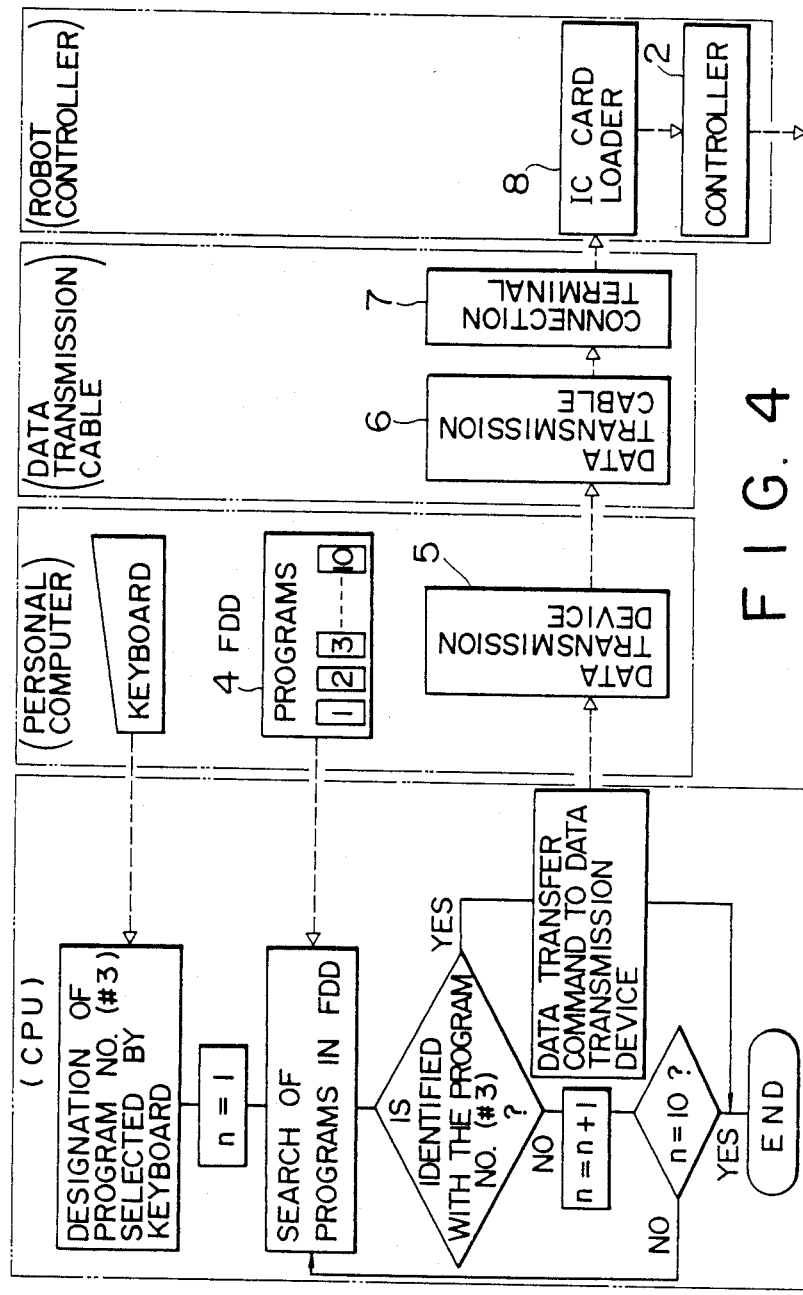
FIG. 4 is a flow chart showing a program selection procedure for transmitting data to the controller of the robot according to the second embodiment.
Figure 5:
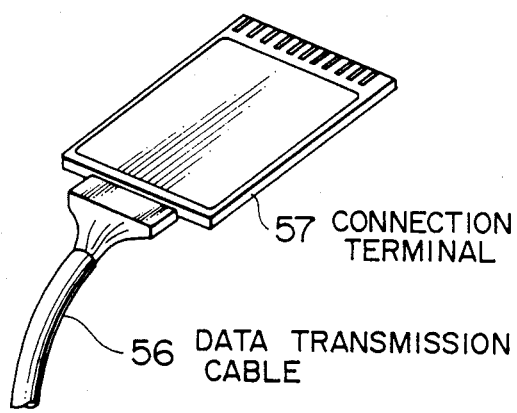
FIG. 5 is a perspective view showing part of a data transmission cable connecting between a data transmission device and the controller of the robot according to the embodiment and a connection terminal connected to an IC card loader.
Figure 6:
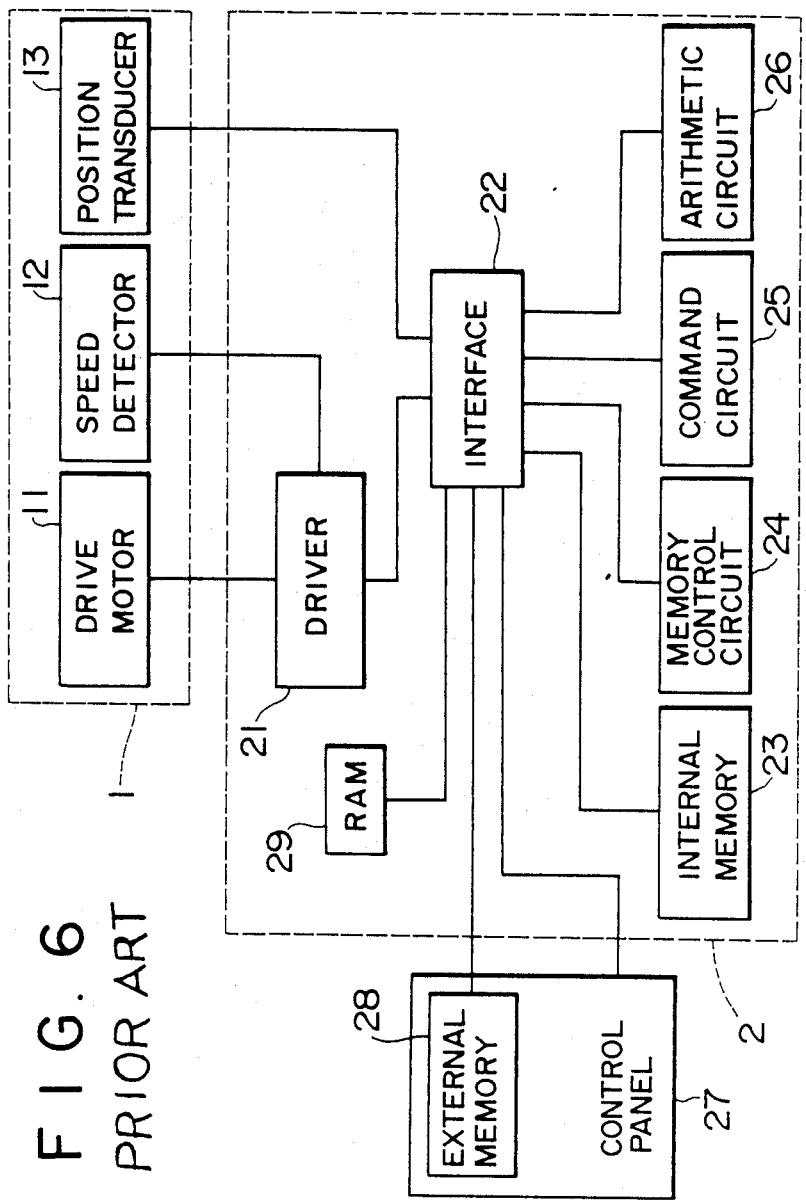
FIG. 6 is a block diagram showing a conventional control system.
Figure 7:
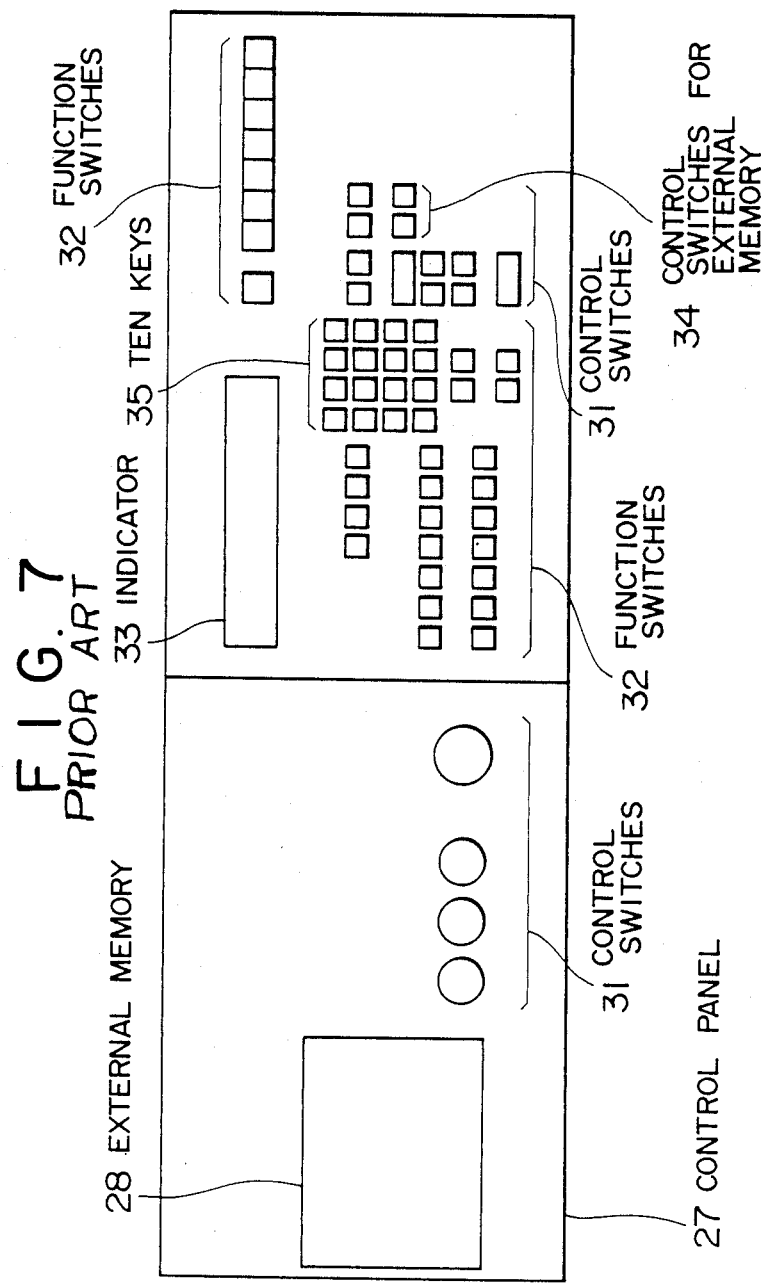
FIG. 7 schematically illustrates a control panel of the conventional control system.
Figure 8:
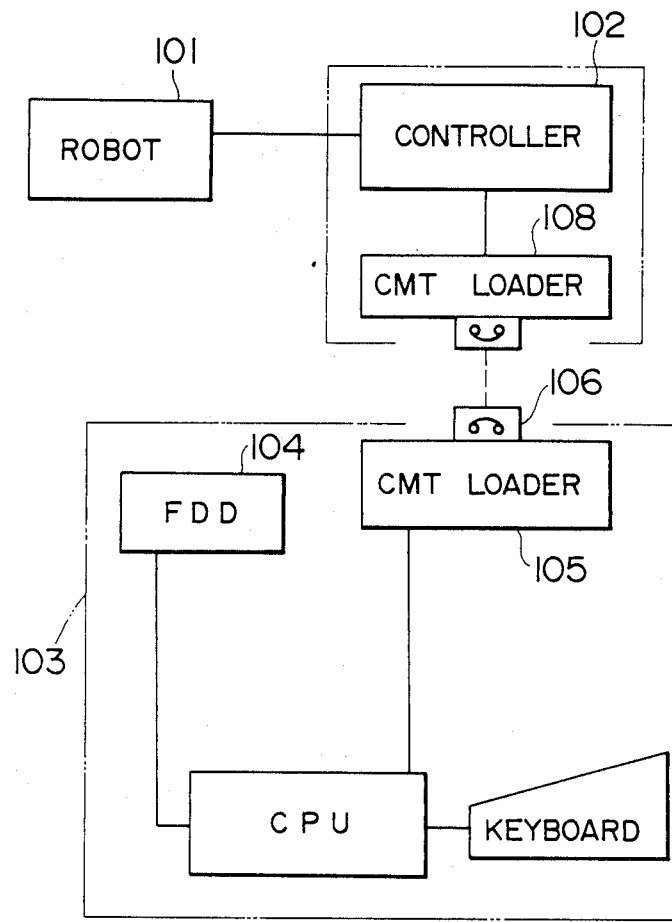
FIG. 8 is a block diagram showing a configuration of another conventional control system of a robot.

FIG. 3 is a block diagram showing a configuration of a control system of a robot with data transmission function according to a second embodiment of the present invention, FIG. 4 is a flow chart showing a program selection procedure for transmitting data to the controller of the robot according to the second embodiment, and FIG. 5 is a perspective view showing part of a data transmission cable connecting between a data transmission device and the controller of the robot according to the second embodiment and a connection terminal connected to the IC card loader. In FIG. 3, numeral 51 denotes aa robot, numeral 52 denotes a controller of the robot, numeral 53 denotes a personal computer, numeral 54 denotes an FDD, numeral 55 denotes a data transmission device, numeral 56 denotes a data transmission cable, numeral 57 denotes a connection terminal, and numeral 58 denotes an IC card loader.

The industrial robot 51 includes a control system which has an IC card as a storage medium and performs reading data stored in the IC card and playback operation simultaneously without transmission of the stored data to a memory within the controller 52. In the system, the data transmission device 55 provided in the personal computer 53 is connected to the IC card loader 58 of the controller 52 through the data transmission cable 56 having the connecting terminal 57 shown in FIG. 5 with the same connection structure as the IC card. Thus, a necessary program of many programs stored in the FDD 54 is selected by a keyboard of the personal computer 53 and is directly supplied to the IC card loader 58 of the controller 52 to effect reading out and operation.

With the above configuration, a necessary program of a plurality of programs stored in the FDD 54 correspondingly to various operations is selectively designated by the keyboard of the personal computer 53 (in this case, for example, No. 3 is designated) so that data is transmitted from the data transmission device 55 through the data transmission cable 56 and the connecting terminal 57 to the controller 52 of the robot and the robot is operated. At this time, as shown in FIG. 4, when the number of the selected program is not identical with the number of the program in be selected, n is incremented by 1 and the number of a next program is searched from the FDD 54. The search is repeated until the program to be selected is found. In this manner, since the personal computer is provided with a predetermined capacity of buffer memory, a next program can be selected by a work selection signal supplied from other device during the transmission of the program. Accordingly, the operation of the robot 51 is not interrupted and the reading and operation can be performed for different programs continuously.

FIG. 5 schematically illustrates the IC card loader side of the data transmission cable 56.

The control system can transmit data without providing any special modification or device for the data transmission in the side of the controller 52 of the robot and is applicable to the robot for various production.

The present invention is not limited to the above configuration and the following function and configuration can be implemented as other embodiments (only different points from the above embodiments are described).

(1) The controller 52 of the robot may include a program data memory.

(2) Two or more IC card loaders 58 are provided and the connecting terminal 57 of the data transmission cable 56 may be inserted into the other IC card loader without extraction of the IC card. The IC card loaders may be switched by a change-over switch.

(3) The control system with data transmission function can provide a plurality of data transmission devices such as the personal computer 53, the FDD 54 and the data transmission device 56.

As described above in detail, according to the present invention, since an expensive data transmission device is not required on the side of the robot and any additional modification and device for connecting the data transmission device are not required, an inexpensive robot can be provided. Further, since the robot operation program stored in the FDD of the personal computer is not required to be transmitted to the memory of the robot, there is no useless time for modification of the program and various operation can be continued efficiently.

We claim:

1. A control system of an industrial robot in which an operation program of the robot is read out from a storage medium and is processed to obtain data to control a robot machine on the basis of the data, said robot being characterized in external memory means for selectively reading out a program from a plurality of stored operation programs said external memory means including a data transmission device for transmitting the program, control means, including an IC card loader, for supplying the operation program to control the robot machine, and a data transmission cable having a connection terminal mounted at one end thereof for insertion into said IC card loader to connect between said data transmission device and said IC card loader and for supplying the operation program from said external memory means through the data transmission cable to said control means.

2. A control system of an industrial robot according to claim 1, wherein said external memory means comprises a personal computer.

* * * * *